(12) United States Patent
Abu-Jdayil et al.

(10) Patent No.: US 12,545,768 B2
(45) Date of Patent: Feb. 10, 2026

(54) METHOD OF MAKING A BIODEGRADABLE THERMAL INSULATION COMPOSITE BASED ON POLY (β-HYDROXYBUTYRATE)

(71) Applicant: UNITED ARAB EMIRATES UNIVERSITY, Al Ain (AE)

(72) Inventors: Basim Abu-Jdayil, Al Ain (AE); Amal Mlhem, Al Ain (AE); Muhammad Iqbal, Al Ain (AE)

(73) Assignee: UNITED ARAB EMIRATES UNIVERSITY, Al Ain (AE)

(*) Notice: Subject to any disclaimer, the term of this patent is extended or adjusted under 35 U.S.C. 154(b) by 127 days.

(21) Appl. No.: 18/231,446

(22) Filed: Aug. 8, 2023

(65) Prior Publication Data

US 2025/0051530 A1  Feb. 13, 2025

(51) Int. Cl.
| | | |
|---|---|---|
| C08J 5/04 | (2006.01) | |
| C09K 5/14 | (2006.01) | |
| B29C 43/02 | (2006.01) | |
| B29C 71/02 | (2006.01) | |
| B29K 67/00 | (2006.01) | |
| B29K 311/10 | (2006.01) | |

(52) U.S. Cl.
CPC ............ C08J 5/045 (2013.01); C09K 5/14 (2013.01); *B29C 43/02* (2013.01); *B29C 71/02* (2013.01); *B29C 2071/022* (2013.01); *B29K 2067/00* (2013.01); *B29K 2311/10* (2013.01); *B29K 2995/006* (2013.01); *C08J 2367/04* (2013.01)

(58) Field of Classification Search
CPC .......... C09K 5/14; C08J 5/06; C08J 2367/04; B29C 71/02; B29C 2071/022; B29K 2067/00; B29K 2311/10; B29K 2995/006
See application file for complete search history.

(56) References Cited

U.S. PATENT DOCUMENTS 10,655,009 B1  5/2020  Abu-Jdayil et al.
11,359,095 B1  6/2022  Abu-Jdayil et al.

FOREIGN PATENT DOCUMENTS

CN  112280266 A  *  1/2021  ............. C08L 67/04

OTHER PUBLICATIONS

Machine translation CN 112280266 A to Duan, Li and Meng, published Jan. 29, 2021 (Year: 2021).*
Al Abdallah, Hyder Ali Reyah. "Development of heat insulation composite materials based on bio-polyesters and natural polyesters and natural filler." Master of Science Thesis (Apr. 2021).
Mlhem, Amal. "Biodegradable Heat Insulation Composites Based on Poly(B-hydroxybutyrate) and Date Palm Wood." Master's Thesis Defense (Nov. 29, 2022).
Al Abdallah, Hyder et al. "Improvement of mechanical properties and water resistance of bio-based thermal insulation material via silane treatment." Journal of Cleaner Production 346 (2022): 131242. (Abstract only).
Mlhem, Amal et al. "Sustainable heat insulation composites from date palm fibre reinforced poly (β-hydroxybutyrate)." Journal of Building Engineering 54 (2022): 104617.
Abu-Jdayil, Basim et al. "Date palm wood waste-based composites for green thermal insulation boards." Journal of Building Engineering 43 (2021): 103224.

* cited by examiner

*Primary Examiner* — Jane L Stanley
(74) *Attorney, Agent, or Firm* — Nath, Goldberg & Meyer; Joshua B. Goldberg

(57) ABSTRACT

A method of making a biodegradable thermal insulation composite based on poly(β-hydroxybutyrate) includes immersing powdered date palm fibers in a silane-grafting solution to produce silylated date palm fibers. The silylated date palm fibers are then suction filtered, washed with deionized water, and dried. The silylated date palm fibers are then melt extruded with poly(β-hydroxybutyrate) pellets to produce the biodegradable thermal insulation composite. The biodegradable thermal insulation composite may then be hot-pressed in a mold and may be further annealed. Alternatively, polylactic acid or poly(β-hydroxybutyrate) is dissolved in chloroform to form a solution. The solution is heated and poured on a volume of powdered date palm fibers such that a surface thereof is completely covered with the solution. The covered date palm fibers are then melt extruded with poly(β-hydroxybutyrate) pellets to produce the biodegradable thermal insulation composite, followed by hot-pressing in a mold and annealing.

2 Claims, 3 Drawing Sheets

METHOD OF MAKING A BIODEGRADABLE THERMAL INSULATION COMPOSITE BASED ON POLY (β-HYDROXYBUTYRATE)

BACKGROUND

Field

The disclosure of the present patent application relates to a biodegradable thermal insulation, and particularly to a biodegradable thermal insulation made from modified date palm fibers.

Description of Related Art

Most currently used building materials are prepared from non-renewable resources, with the energy-intensive production of insulation materials having a particularly negative effect on the environment. At present, about 11% of all carbon dioxide emissions are directly related to the manufacture of building materials. Insulation materials contribute heavily to this carbon dioxide release and, in addition to their environmental impact, are also costly financially. Since insulation material is intended to reduce overall energy consumption, there is a need for insulation materials which do not offset their benefits with their costs, both financially and to the environment.

Biodegradable polymers derived from renewable resources are of great interest, particularly with regard to the manufacture of construction materials. At present, poly-β-hydroxybutyrate (PHB) is of great interest, particularly due to its biodegradability and biocompatibility. However, one of the major drawbacks to the widespread commercialization of PHBs is their high cost compared to conventional petrochemical-based plastic materials. Currently, the cost of PHB is around 8-10 times that of conventional plastics. Being able to combine PHB with other materials, particularly materials with minimal impact on the environment, in order to reduce the overall amount of PHB in an insulating material while still retaining its desirable properties, would greatly reduce the cost of manufacture and allow for widespread commercialization. Thus, a method of making a biodegradable thermal insulation composite based on poly (β-hydroxybutyrate) solving the aforementioned problems is desired.

SUMMARY

In one embodiment, a method of making a biodegradable thermal insulation composite based on poly(β-hydroxybutyrate) includes immersing powdered date palm fibers in a silane-grafting solution to produce silylated date palm fibers. The silylated date palm fibers are then suction filtered, washed with deionized water, and dried. The silylated date palm fibers are then melt extruded with poly(β-hydroxybutyrate) pellets to produce the biodegradable thermal insulation composite. The biodegradable thermal insulation composite may then be hot-pressed in a mold and may be further annealed.

In order to produce the initial powdered date palm fibers, date palm fibers may be washed with deionized water, dried in a convection oven or the like, and then ground to produce the powdered date palm fibers. The powdered date palm fibers may be sieved such that the powdered date palm fibers each have a maximum fiber length of about 212 μm. Following sieving, the powdered date palm fibers may be dried again in a convection oven or the like, such that the powdered date palm fibers have a constant weight.

The silane-grafting solution may be produced by hydrolyzing an about 2 wt % solution of 3-aminopropyl triethoxysilane with ethanol solution (as the grafting solution) to produce the silane-grafting solution. Alternatively, the silane-grafting solution may be produced by hydrolyzing an about 2 wt % solution of 3-aminopropyl triethoxysilane with an acetone solution (as the grafting solution) to produce the silane-grafting solution.

In an alternative embodiment, the method of making the biodegradable thermal insulation composite based on poly (β-hydroxybutyrate) can include dissolving polylactic acid in chloroform to form a 2% (w/v) polylactic acid solution, which can then be heated under constant stirring. The heated polylactic acid solution can be poured on a volume of powdered date palm fibers such that a surface of the date palm fibers can be completely covered with the heated polylactic acid solution. The powdered date palm fibers may be prepared as described above with regard to the previous embodiment. The covered date palm fibers can then be melt extruded with poly(β-hydroxybutyrate) pellets to produce the biodegradable thermal insulation composite. The biodegradable thermal insulation composite may then be hot-pressed in a mold, and may be further annealed.

In a further alternative embodiment, the method of making the biodegradable thermal insulation composite based on poly(β-hydroxybutyrate) includes dissolving poly(β-hydroxybutyrate) in chloroform to form a 2% (w/v) poly(β-hydroxybutyrate) solution, which is then heated under constant stirring. The heated poly(β-hydroxybutyrate) solution can be poured on a volume of powdered date palm fibers such that a surface of the date palm fibers can be completely covered with the heated poly(β-hydroxybutyrate) solution. The powdered date palm fibers may be prepared as described above with regard to the previous embodiments. The covered date palm fibers can then be melt extruded with poly(β-hydroxybutyrate) pellets to produce the biodegradable thermal insulation composite. The biodegradable thermal insulation composite may then be hot-pressed in a mold and may be further annealed.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
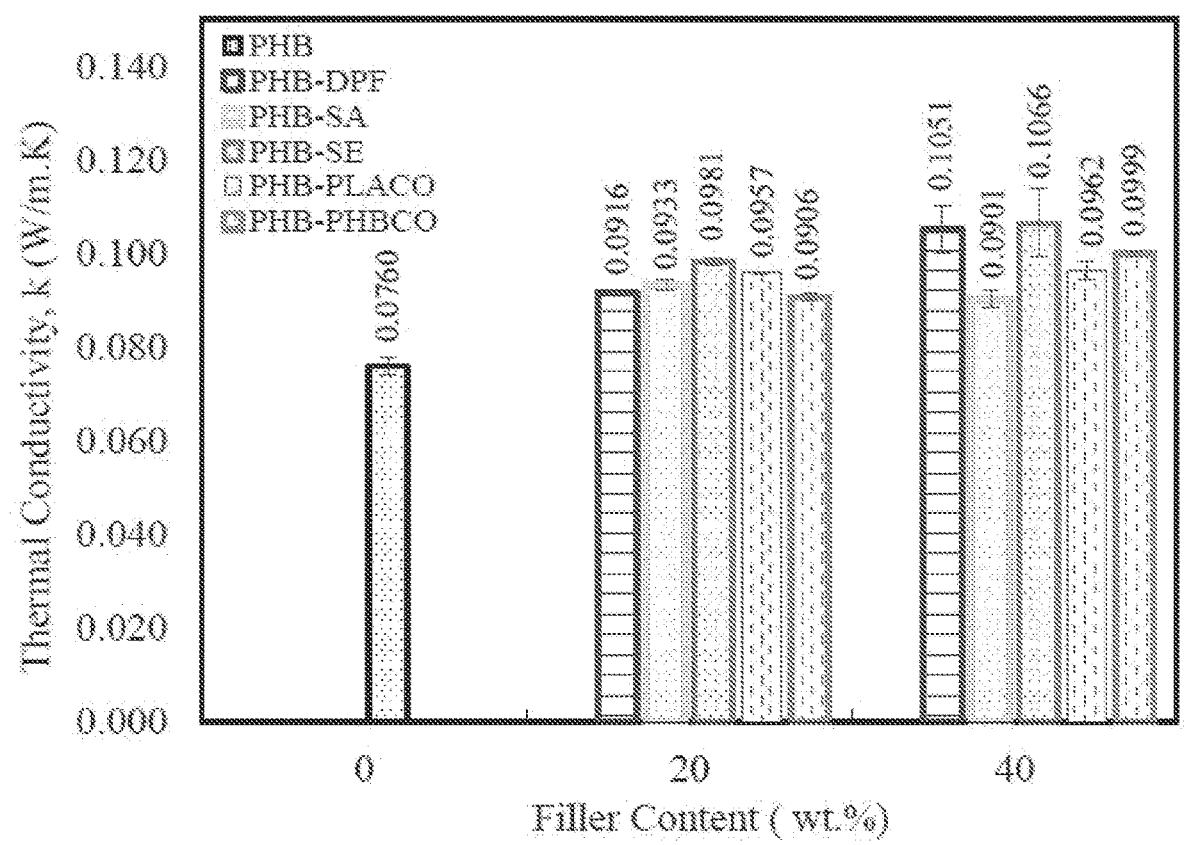
FIG. 1 is a graph showing a comparison of thermal conductivity measured at 25° C. for pure poly(β-hydroxybutyrate) (PHB), untreated fiber-reinforced PHB (PHB-DPF), PHB-coated fiber-reinforced PHB (PHB-PHBCO), polylactic acid (PLA)-coated fiber-reinforced PHB (PHB-PLACO), silane-acetone treated fiber reinforced PHB (PHB-SA), and silane-ethanol treated fiber reinforced PHB (PHB-SE), where the PHB-PHBCO, the PHB-PLACO, the PHB-SA and the PHB-SE were each prepared using a present method of making biodegradable thermal insulation composite based on poly(β-hydroxybutyrate).

The following definitions are provided for the purpose of understanding the present subject matter and for construing the appended patent claims.

Definitions

Throughout the application, where compositions are described as having, including, or comprising specific components, or where processes or methods are described as having, including, or comprising specific process steps, it is contemplated that compositions of the present teachings can also consist essentially of, or consist of, the recited components, and that the processes or methods of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In one embodiment, a method of making a biodegradable thermal insulation composite based on poly(β-hydroxybutyrate) can include immersing powdered date palm fibers in a silane-grafting solution to produce silylated date palm fibers. 1 g of the powdered date palm fibers may be immersed in 100 mL of the solution for approximately two hours, as a non-limiting example. The silylated date palm fibers can then be suction filtered, washed with deionized water, and dried in an oven or the like for approximately two hours at a temperature of about 105° C. to about 115° C., or approximately 110° C. The silylated date palm fibers can then be melt extruded with poly(β-hydroxybutyrate) pellets to produce the biodegradable thermal insulation composite. The biodegradable thermal insulation composite may then be hot-pressed in a mold, such as a stainless steel mold or the like, and may be further annealed.

In order to produce the initial powdered date palm fibers, date palm fibers may be washed with deionized water, dried in a convection oven or the like, and then ground to produce the powdered date palm fibers. The drying of the date palm fibers in the convection oven may be performed for approximately 24 hours at a temperature of approximately about 101° C. to about 110° C., or 105° C. The powdered date palm fibers may be sieved such that the powdered date palm fibers each can have a maximum fiber length of about 212 μm. Following sieving, the powdered date palm fibers may be dried again in a convection oven or the like at a temperature of about 75° C. to about 85° C., or approximately 80° C. until the powdered date palm fibers have a constant weight.

The silane-grafting solution may be produced by hydrolyzing a 2 wt % solution of 3-aminopropyl triethoxysilane with an ethanol solution (as the grafting solution) to produce the silane-grafting solution (90% grafting solvent and 10% deionized water). Alternatively, the silane-grafting solution may be produced by hydrolyzing a 2 wt % solution of 3-aminopropyl triethoxysilane with an acetone solution (as the grafting solution) to produce the silane-grafting solution (90% grafting solvent and 10% deionized water). The silane may be hydrolyzed with the grafting solvent for approximately one hour at a temperature of approximately 25° C.

In an alternative embodiment, the method of making the biodegradable thermal insulation composite based on poly (β-hydroxybutyrate) may include dissolving polylactic acid in chloroform to form a 2% (w/v) polylactic acid solution, which can then be heated under constant stirring. The heating and stirring may be performed at a temperature of approximately 100° C. for approximately one hour. The heated polylactic acid solution can be poured on a volume of powdered date palm fibers such that a surface of the date palm fibers can be completely covered with the heated polylactic acid solution. The powdered date palm fibers may be prepared as described above with regard to the previous embodiment. The covered date palm fibers can then be melt extruded with poly(β-hydroxybutyrate) pellets to produce the biodegradable thermal insulation composite. The biodegradable thermal insulation composite may then be hot-pressed in a mold and may be further annealed.

In a further alternative embodiment, the method of making the biodegradable thermal insulation composite based on poly(β-hydroxybutyrate) can include dissolving poly(β-hydroxybutyrate) in chloroform to form a 2% (w/v) poly(β-hydroxybutyrate) solution, which can then be heated under constant stirring. The heating and stirring may be performed at a temperature of approximately 100° C. for approximately one hour. The heated poly(β-hydroxybutyrate) solution can be poured on a volume of powdered date palm fibers such that a surface of the date palm fibers can be completely covered with the heated poly(β-hydroxybutyrate) solution. The powdered date palm fibers may be prepared as described above with regard to the previous embodiments. The covered date palm fibers can then be melt extruded with poly(β-hydroxybutyrate) pellets to produce the biodegradable thermal insulation composite. The biodegradable thermal insulation composite may then be hot-pressed in a mold and may be further annealed.

EXAMPLES

Example 1

For purposes of comparison, biodegradable thermal insulation composites were prepared as described above with loadings of poly(β-hydroxybutyrate) (i.e., using the poly(β-hydroxybutyrate) pellets in the melt extrusion stage) of 0 wt %, 20 wt % and 40 wt %. These samples were further compared against various control samples. FIG. 1 shows a comparison of thermal conductivity measured at 25° C. for pure poly(β-hydroxybutyrate) (PHB), untreated fiber-reinforced PHB (PHB-DPF), PHB-coated fiber-reinforced PHB (PHB-PHBCO), polylactic acid (PLA)-coated fiber-reinforced PHB (PHB-PLACO), silane-acetone treated fiber reinforced PHB (PHB-SA), and silane-ethanol treated fiber reinforced PHB (PHB-SE).

As shown in FIG. 1, the thermal conductivity values of the sample composites are within the benchmark of conventional insulation materials (~0.100 W/m·K). The PHB-DPF composites have high insulation capacities with values ranging between 0.0916 and 0.1051 W/m·K. Generally, at 20 wt % of the filler, the PHB coating significantly reduced the thermal conductivity to 0.0906 W/m·K. For composites filled with higher concentrations of date palm fiber, the PHB-acetone silylated fiber had, by far, the lowest thermal conductivity value among other composites (0.0906 W/m·K). Further, the obtained values are very promising when compared with those of other thermal insulation materials, such as expanded vermiculite (0.062-0.100 W/m·K), lightweight expanded clay aggregate (0.08-0.20 W/m·K), polyester-camelina stalk (0.0994-0.216 W/m·K), polystyrene-date palm fiber (0.1185-0.1392 W/m·K), and polyester-date pits (0.126-0.138 W/m·K).

Example 2

Figure 2:
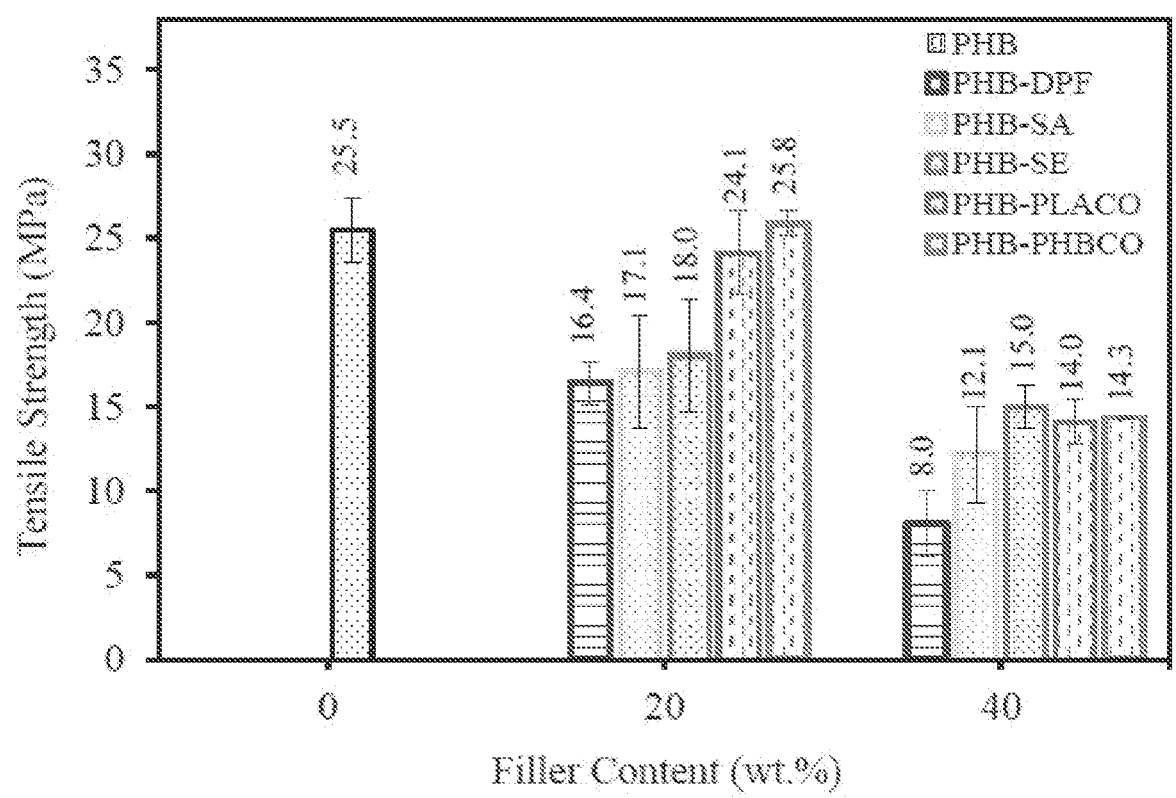
FIG. 2 is a graph showing a comparison of tensile strength for pure poly(β-hydroxybutyrate) (PHB), untreated fiber-reinforced PHB (PHB-DPF), PHB-coated fiber-reinforced PHB (PHB-PHBCO), polylactic acid (PLA)-coated fiber-reinforced PHB (PHB-PLACO), silane-acetone treated fiber reinforced PHB (PHB-SA), and silane-ethanol treated fiber reinforced PHB (PHB-SE), where the PHB-PHBCO, the PHB-PLACO, the PHB-SA and the PHB-SE were each prepared using a present method of making biodegradable thermal insulation composite based on poly(β-hydroxybutyrate).

A comparison of tensile strength for the same samples is shown in FIG. 2. As shown in FIG. 2, modifying the surfaces of date palm fibers enhanced compatibility with polymer matrix, thus increasing the strength of the composites, particularly when compared against the PHB-DPF composite. The 20 wt % PHB-PHB coated fiber composite achieved a significant enhancement by 57% (reaching 25.8 MPa), which is considerably higher than that of the PHB-DPF composite (16.4 MPa). With regard to high fiber loadings, the tensile strength values were very close, ranging from 12 to 15 MPa. However, the PHB-loaded composites showed superior tensile strengths when compared with other commercial thermal insulators and construction materials, such as concrete (2.77 MPa), extruded polystyrene (0.35 MPa), and expanded polystyrene (0.52 MPa).

Example 3

Figure 3:
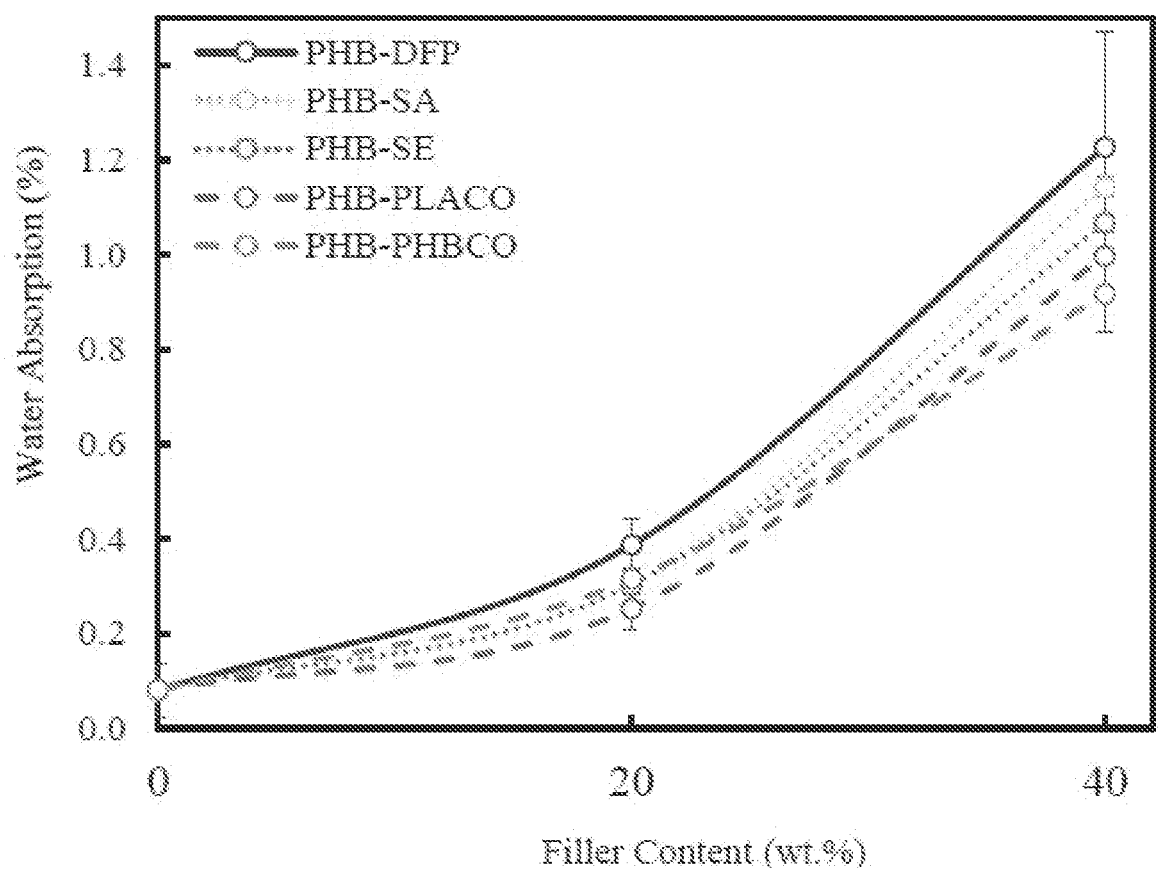
FIG. 3 is a graph showing a comparison of water absorption after 24 hours of immersion in 25° C. water for pure poly(β-hydroxybutyrate) (PHB), untreated fiber-reinforced PHB (PHB-DPF), PHB-coated fiber-reinforced PHB (PHB-PHBCO), polylactic acid (PLA)-coated fiber-reinforced PHB (PHB-PLACO), silane-acetone treated fiber reinforced PHB (PHB-SA), and silane-ethanol treated fiber reinforced PHB (PHB-SE), where the PHB-PHBCO, the PHB-PLACO, the PHB-SA and the PHB-SE were each prepared using a present method of making biodegradable thermal insulation composite based on poly(β-hydroxybutyrate).

FIG. 3 shows a comparison of water retention behavior for the above sample composites after 24 hours of immersion in the cold water (25° C.). The fibers coated with polyester-polymer drastically reduced the tendency of the PHB-DFP composites to absorb water. At 40 wt % loading of date palm fibers, the PHB-DPF composite absorbed 1.22%. The coating reduced the water absorption of the PLA and PHB coated fiber composites by 25% and 18%, respectively. Similarly, treating the date palm fibers with silane significantly reduced the water uptake percentage of the composite, with a resultant range of 1.06%-1.14%. Overall, the loaded composites had a water absorption percentage similar to that of expanded polystyrene, which absorbs no more than 0.3% (by volume).

It is to be understood that the method of making a biodegradable thermal insulation composite based on poly (β-hydroxybutyrate) is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A method of making a biodegradable thermal insulation composite based on poly(β-hydroxybutyrate), consisting of the steps of:
   washing date palm fibers with deionized water;
   drying the washed date palm fibers; and
   grinding the dried and washed date palm fibers to produce powdered date palm fibers;
   sieving the powdered date palm fibers such that the powdered date palm fibers each have a maximum fiber length of 212 μm;
   immersing the powdered date palm fibers in a silane-grafting solution to produce silylated date palm fibers;
   suction filtering the silylated date palm fibers;
   washing the silylated date palm fibers with deionized water;
   drying the silylated date palm fibers at a temperature of about 105° C. to about 115° C. for about two hours;
   melt extruding the silylated date palm fibers with poly(β-hydroxybutyrate) pellets to produce a biodegradable thermal insulation composite;
   hot-pressing the biodegradable thermal insulation composite in a mold; and
   annealing the molded biodegradable thermal insulation composite.

2. A biodegradable thermal insulation composite based on poly(β-hydroxybutyrate) produced according to the method of claim 1.

* * * * *